R. C. BLACKWELL.
Assignor of one-third to W. H. LEWIS.
RUNNING GEAR FOR WAGONS.
No. 10,784. Reissued Nov. 23, 1886.
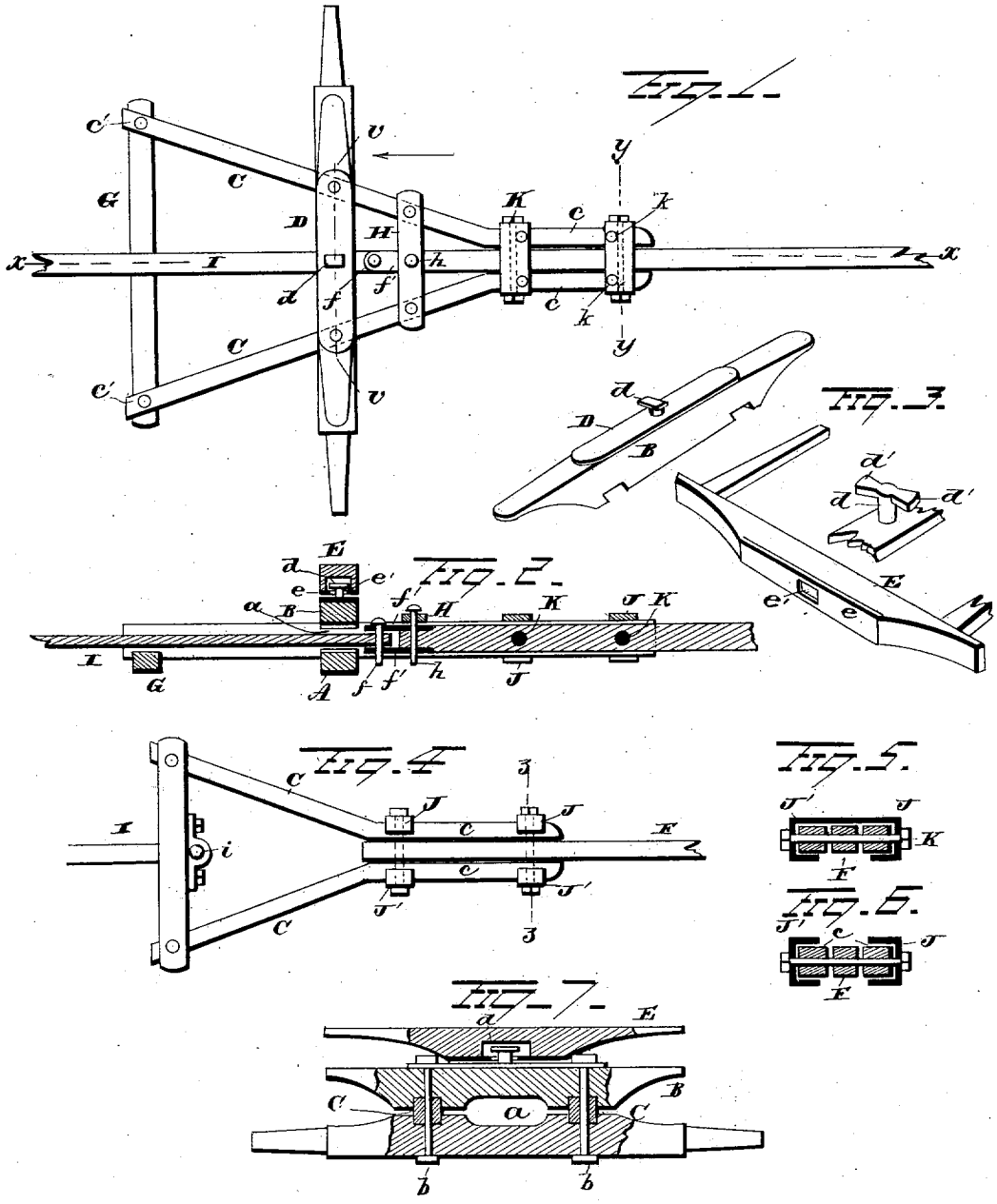
WITNESSES
S. G. Nottingham
William H. Ruff
INVENTOR
R. C. Blackwell.
By H. A. Seymour,
ATTORNEY
N. PETERS, Photo-Lithographer, Washington, D. C.

UNITED STATES PATENT OFFICE.

RICHARD CHAPMAN BLACKWELL, OF HENDERSON, KENTUCKY, ASSIGNOR OF ONE-THIRD TO WILLIAM HENRY LEWIS, OF SAME PLACE.

RUNNING-GEAR FOR WAGONS.

SPECIFICATION forming part of Reissued Letters Patent No. 10,784, dated November 23 1886.

Original No. 290,171, dated December 11, 1883. Application for reissue filed April 23, 1884. Serial No. 129,016.

*To all whom it may concern:*

Be it known that I, RICHARD CHAPMAN BLACKWELL, a citizen of the United States, and a resident of Henderson, in the county of Henderson and State of Kentucky, have invented certain new and useful Improvements in Wagons, of which the following is a specification.

The object of my invention is to provide a strong and economical construction of wagons or vehicles, whereby the fifth-wheel or king-bolt as now arranged will be dispensed with, the tongue more rigidly fastened, the forward axle, head-block, and hounds rigidly and permanently secured together, and the bolster securely swiveled upon the head-block or sand-board.

My present improvement will be fully understood by the following description, with reference to the accompanying drawings, in which—

Figure 1 represents a top plan view of the front part of the wagon constructed according to my present invention. Fig. 2 is a longitudinal vertical section of the same, taken on the line *x x* of Fig. 1. Fig. 3 is a detail perspective view of the head-block and bolster separated from each other, to better show the construction of the device for connecting them. Fig. 4 is a view similar to Fig. 1, showing a modification in the manner of attaching the reach to the front part of the wagon. Figs. 5 and 6 are detail cross-sections taken through the lines *y y* of Fig. 1 and *z z* of Fig. 4, respectively. Fig. 7 is a vertical section taken lengthwise of the bolster, head-block, and axle through the lines *v v* of Fig. 1, as seen in the direction of the arrow.

Like letters of reference indicate like parts in the several figures.

A is the front axle of the wagon. B is the head-block, and C the hounds.

D is a bolster-plate fastened on the top of the head-block B, and provided with a central pin or lock-bolt, *d*, constructed as will hereinafter be described, for removably attaching the bolster E. The hounds C are fitted into recesses formed across the upper surface of the axle A and lower surface of the head-block B, respectively, as shown in Fig. 7; and in the center, between the said grooves, the respective upper and lower surfaces of the axle A and head-block B are cut away, so that between them is formed a central opening, *a*, for receiving the front end of the reach and allowing the same to oscillate laterally in the said opening. The plate D, head-block B, hounds C, and axle A are securely and rigidly fastened together by bolts *b* through the said four parts simultaneously, as shown in Fig. 7.

On the upper end of the bolster-pivot *d* are formed, in front and rear thereof, projecting lugs *d'*, and to the under side of the bolster E is secured a plate, *e*, having centrally a longitudinal slot, *e'*, whose length is a little in excess of the difference between the extreme edges of the lip *d'*, and whose width is smaller than its length, so that if the bolster E is placed at right angles to the head-block B, with the central slot, *e'*, upon the lock-bolt *d*, the latter will enter the slot *e'*, allowing the bolster to sink down with its plate *e* resting upon the plate D, and the lips *d'* will then be above the upper or inner surface of the plate *e*, and, when the bolster E is turned in any other position than at right angles to the head-block, will overlap the side edges of the slot *e'*, and thus lock the bolster to the head-block, while allowing it to move freely on the pivot and preventing its being taken off from the same, except by turning it in the position at right angles to the head-block, as above stated, and then raising it.

Between the forward and parallel ends, *c*, of the hounds C the tongue F is inserted and secured, as will presently appear; and at the rear ends, *c'*, of the diverging portions of the hounds, and also in front of the axle A, the hounds are securely connected by cross-braces G H, respectively.

In order to rigidly fasten the tongue F against vertical as well as lateral deflection, I have provided metallic clamps J J', embracing the top, bottom, and outer side surfaces of the front parts, *c*, of the hounds. These clamps J J' are either made separate, as shown in Fig. 6, or they are connected to the top or bottom of the tongue, (or both to the top and bottom,) and both made in one piece, as shown in Fig. 5. The bolt K is then inserted horizontally through the clamps J J', hound ends *c*, and tongue F, securing all together simultaneously, as shown in Figs. 5 and 6. The rear end of the tongue F is secured to the brace H by a bolt, *h*, and is provided on its upper and lower surfaces with rearward-projecting plates *f'*, forming lugs, between which is pivoted by the king-bolt *f* the forward end of the reach I. It is evident that by pivoting the reach in the center line of the wagon, but outside of the axle, the head-block and front part of the wagon may be oscillated laterally, as usual, with relation to the rear part without using for that purpose the ordinary fifth-wheel or king-bolt passing through A I B E simultaneously. Again, when the king-bolt passes through the front axle, the latter is weakened and the back part of said axle compelled to pull the rear portion of the wagon and its load, and also carry a portion of the load, or, in other words, the front axle pulls and carries the whole load; but when the king-bolt is dispensed with and the reach-bar disconnected from the front axle and connected directly to the hounds, so that the draft of the team will fall directly on the reach-bar, the unnecessary duty is removed from the front axle and the strain transmitted directly to the rear axle through the reach-bar.

I am aware that it is not new to secure the rear end of a tongue to the front end of a reach-bar, the front end of said reach-bar being secured to the front axle to hold it in position, and hence I make no claim thereto. In my device the front end of the reach-bar passes through an opening between the axle and head-block, and is free to move laterally between said parts to accommodate itself to the movement of the tongue.

Instead of pivoting the forward end of the reach I to the rearward end of the tongue F, it may be pivoted between lugs *i*, secured directly to the front (or the rear) side of the head-block and axle B A, as shown in Fig. 4. It is evident that the reach can be pivoted also at the rear of the axle A by extending the rear end of the tongue F through the central opening, *a*; but I prefer the construction shown. The encircling clamps J J' may be further fastened to the front ends, *c*, of the hounds by vertical bolts *k*, as shown in Fig. 1.

From the foregoing it will be seen that I have dispensed with the old mode of connecting the front and rear parts of a four-wheeled vehicle by means of a king-bolt passing through the axle and coupling-pole or reach, the head-block or sand-board, and bolster simultaneously. I have also made the tongue of the wagon or other four-wheeled vehicle conveniently removable for storage or shipment by simply removing the bolts *f h* K K, which is a great advantage over vehicles with irremovable tongues, as now made.

Having fully described my invention, what I claim as new, and desire to secure by Letters Patent, is—

1. In a vehicle, the combination, with the front axle, a head-block secured to said axle, and a bolster loosely connected to the head-block, of a reach-bar disconnected from the front axle and head-block and connected to the tongue, and devices connecting the tongue and head-block or axle.

2. In a vehicle, the combination, with the front axle, a head-block secured to said axle, a bolster, and a king-bolt connecting the bolster and head-block, of a reach-bar the front end of which projects forwardly in front of the axle, and a pole or shafts secured to the axle and pivotally connected to the front end of the reach-bar, substantially as set forth.

3. The axle A, head-blocks B, with the interposed hounds C, and the plate D, having bolster-pivot *d*, secured together by the bolts *b*, combined with the bolster E, having plate *e*, provided with recess *e'*, as specified.

4. The combination of the axle A, head-block B, interposed hounds C, and the plate D, having bolster-pivot *d*, secured together by the bolts *b*, to form recess *a*, with the bolster E *e e'*, the tongue F, and reach I, pivoted thereto forward of the axle, as set forth.

RICHARD CHAPMAN BLACKWELL.

Witnesses:
PETER MARION,
J. H. DRAPER.